Nov. 7, 1967    A. C. PETERSON    3,351,537
APPARATUS FOR CONVECTIVE DISTILLATION OF MATERIALS IN
SOLUTION WITH HOT GAS PRODUCED BY COMBUSTION
Filed Oct. 26, 1962    3 Sheets-Sheet 2

INVENTOR
ADOLPHE C. PETERSON

INVENTOR
ADOLPHE C. PETERSON

United States Patent Office 3,351,537
Patented Nov. 7, 1967

3,351,537
APPARATUS FOR CONVECTIVE DISTILLATION OF MATERIALS IN SOLUTION WITH HOT GAS PRODUCED BY COMBUSTION
Adolphe C. Peterson, 4623 Bruce Ave. S., Minneapolis, Minn. 55424
Filed Oct. 26, 1962, Ser. No. 233,231
4 Claims. (Cl. 202—172)

My invention relates chiefly to separation of essential ingredients of a very abundant material into desired forms of the materials composing the very abundant material and the invention is called Means and System for Materials Recovery.

The primary object of my invention is to provide a means which shall be enabled, because of its component elements and units and the manner of their use, to separate the very much desired fresh water or salt-free water from the very abundant sea-water of the ocean, where the water is of such character that it is not available either for human beings or animals or crops or vegetables in growing, for their continued sustentation and development. The water of the ocean is in general available in locations relatively near to those lands of the earth which are generally arid or dry or desert in character as all of such types of lands are generally or very near or relatively near the equator, such as lands in the southern or western portions or southwestern portions of the United States, and such as are in the northern parts of the African continent, or such as are near the Mediterranean sea. Such lands generally could be very fertile, if water was available in sufficient quantity as salt-free water. Likewise the water of the ocean is sometimes very near the large cities of the United States and other countries, which cities must procure fresh water from distant locations by means of canals or conduits which are constructed at very high cost and are therefore almost prohibitive in construction cost. It is the object especially to provide such a means for procurement of salt-free water from such ocean water by a means which in cost shall be within the means and ability of regions and cities which might be served by such a means. The object is the provision of means for the purpose stated which means shall utilize a relatively simple means for the accomplishment of the objective, and which means shall utilize a system which inherently provides a large portion if not all as in some cases, of the heat and power requirements for the operation, and which shall therefore be comparatively a low cost or cost-less systems for such provision, in so far as operation or maintenance cost is concerned.

It is further an object to provide such a system or plant which is so designed that initial construction or capital costs are substantially lower than as otherwise might be the cost involved. It is further an object to provide such a means of accomplishment of the objective as will involve less material of costly nature in its construction and also less labor in the construction of a plant for the purpose stated. While it is contemplated that the chief use of the system and devices will be release or recovery of salt-free water from sea-water, it is intended that the apparatus and method or system is adaptable to similar use for similar purposes with other materials than seawater, such as sewage of cities or communities, and such as the water effluent from manufacturing or chemicals producing plants. A further objective is the provision of such a plant as will easily and with less cost provide the basis for systems for extraction of such materials as magnesium and other metals and elements from sea-water, in connection with the provision of salt-free water.

The principal devices and combinations of devices comprising my invention are as hereinafter described and as further defined in the claims. In the accompanying drawings which illustrate my invention in several forms, like characters refer to like parts in so far as is practicable. Referring to the drawings.

FIGURE 1 is a view chiefly in vertical cross section transversely of the chief units of the device and is on the line 1—1 of FIGURE 2, some parts or units being shown in full side elevation, some parts broken away, some parts diagrammatic in character.

FIGURE 2 is a plan view which is necessarily largely diagrammatic because of the considerable number of devices included and because of the extensive character of units included, this view being on a scale which is very much less than the scale of FIGURE 1, this view showing connections of units as may be shown in plan view some connections being slightly differently located than as in FIGURE 1 for better comprehension of the device, although the functions and use being similar; a plural number of some units being included.

FIGURE 4 is an elevation and part vertical section of a modified form.

Figure 1:
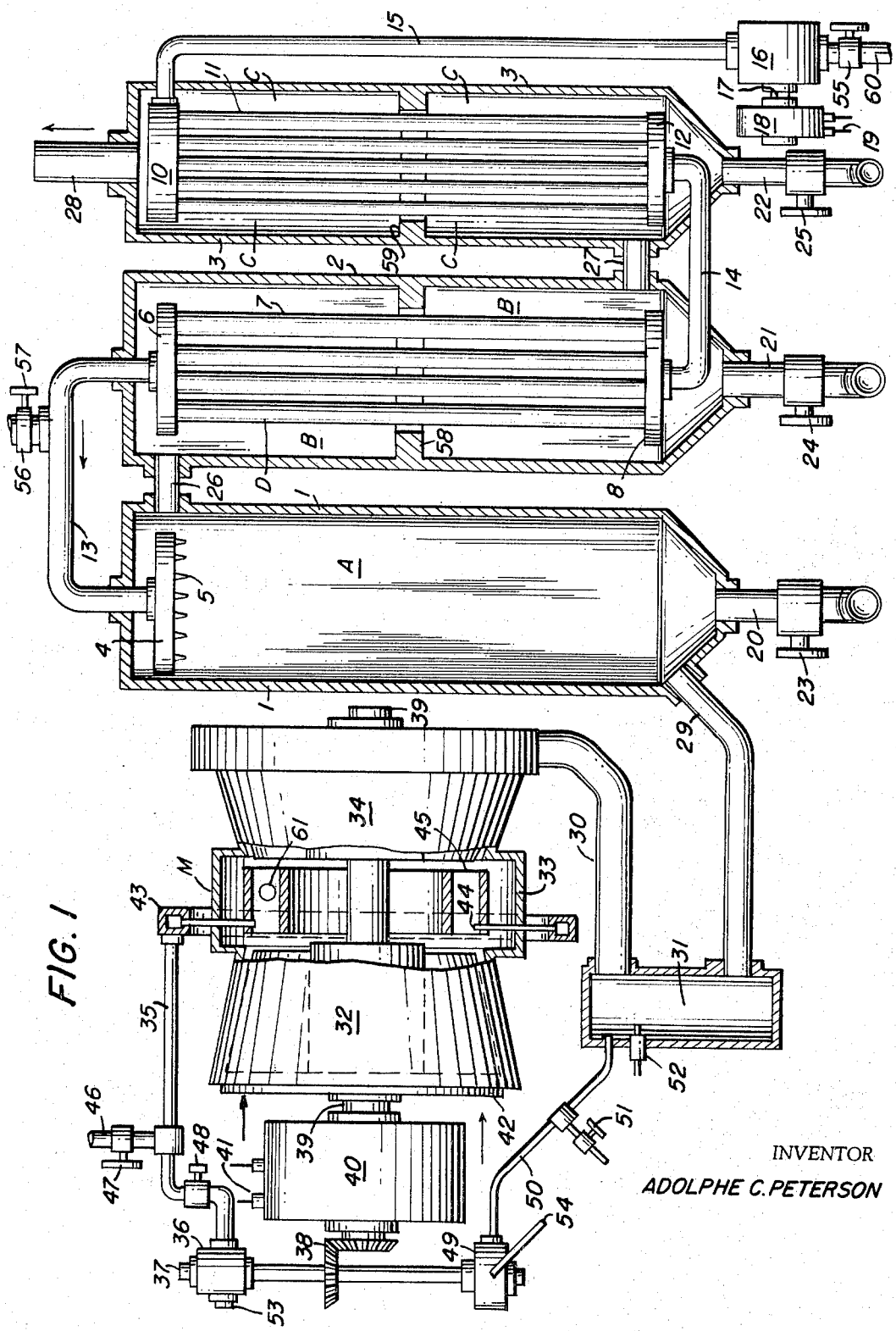

The plant for the purposes indicated and according to my design involves chiefly three chambers as illustrated in FIGURE 1 and these chambers are designated in order beginning at the leftward end; the prime materials chamber or sea-water absorption and heating chamber A, the vapor-condensing chamber B, the supplemental vapor condensing chamber C, the latter being for supplemental condensation after condensation is chiefly performed in chamber B. The chambers designated are formed and supported over any concrete or other base not shown which is formed on any suitable construction site. The chambers designated are formed to be parallel each to the others and each is relatively high and long in proportion to the cross-sectional width (as in FIGURE 1) this proportional construction being more apparent as is shown in the plan view FIGURE 2. The chambers A, B, C, are formed by casings designated respectively as 1, 2, 3, and these casings may be formed of any suitable material such as steel, aluminum, magnesium, ceramic material, concrete material, or any suitable plastic material, the casing material being in each case such a material as will adequately resist corrosion of the material, or the casing material may be coated with any such material as ceramic material or plastic as will provide the desired corrosion and wear resistance. This material selection is a matter of construction engineering and should be that which is suitable and adequate.

The chambers are deep or high vertically and each is a closed chamber at its ends and top and bottom and sides with the exception that there are as to each chamber the inlets and outlets which are hereinafter described. The chambers indicated will in any projected plant be as large in each dimension as is necessary in any particular plant or segment thereof, it being understood that any plant may consist of as many devices of the character which is herein described as is necessary or suitable for the project.

The chamber A has located within it at its extreme upper end a spray means generally designated as 4 and having a large number of spray nozzles or apertures 5 through which solution for separation may emerge, in such manner that the solution descends within the chamber A in very many fine streams or as a fine mist. The chamber B has within it heat transfer unit or means D which has header 6, tubes 7, and lower header 8. The chamber C has within it the heat transfer unit or means E which has the upper header 10, the tubes 11, and the lower header 12.

The spray means 4 has connection by means of the pipe 13 with the upper header 6 of heat transfer unit D thus to receive solution for separation from the heat transfer unit D. The lower header 8 has connection by means of the pipe 14 with the lower header 12 by which solution is received from the heat transfer unit E. The upper header 10 has connection by means of pipe 15 with the discharge of a solution pump 16, the latter being operated through drive shaft 17 by the electric motor 18 which is provided with electric current by main lines 19 the latter having any control means such as is usually provided for electric motors thus providing variable control for the operation of the motor 18 and thus for the flow of solution. Any other means may be provided for control of such flow.

Each of the chambers A, B, C, at its lowermost end is formed to have a trough-like shape whereby there is concentration of material over outlet pipe; 20 for the chamber A, 21 for the chamber B, 22 for the chamber C. Flow through these pipes for effluents is respectively by means of valves 23, 24, 25. From the lower end of chamber A concentrated brine or other remains after evaporation may flow by means of pipe 20. From the lower ends of chambers B and C, condensed liquid water may flow by means, respectively, of the pipes 21 and 22.

The chamber A has at its upper-most end discharge for gases and evaporation by means of the connecting pipe 26 the latter permitting flow from that upper end of chamber A to the upper end of the chamber B. The lower end of the chamber B has at a location, somewhat above the outlet pipe 21, but substantially at the lower end of chamber B, discharge from chamber B to the lower end of the chamber C, whereby there may be flow of gases and any vapor borne thereby to the lower end of the chamber C. The upper end of the chamber C has discharge for gases to the flue or chimney 28 whereby there may be discharge of gases to the external ambient atmosphere. The flow from chamber B to chamber C, for gases, is by the pipe 27.

The lower end of the chamber A, at a location somewhat above the trough or trench-like lower part thereof, has delivering to it a pipe 29 by which there may be flow of exhaust gases from the exhaust pipe 30 of a gas turbine unit M, there being interposed in the flow of exhaust gases a chamber 31. The gas turbine unit M has the air compressor section 32, the combustion section 33, the turbine section 34, these being diagrammatically shown only. Delivery of fuel to the combustion section 33 is by pipe 35 from the fuel pump 36 which is driven by shaft 37, bevel gears 38 and thereby by turbine shaft 39. The turbine shaft 39 drives the armature of the electric generating generator 40 which discharges electric current to the main lines 41. The air compressor section 32 receives ambient atmospheric air by means of the air port means 42 which is diagrammatically shown.

The fuel pipe 35 delivers the fuel through the annular pipe 43, and the fuel nozzles 44 to the annular combustion chamber 45 of the combustion section 33. A fuel by-pass pipe 46 permits by-passing of fuel for regulation by the hand valve 47. Hand-valve 48 is also provided for regulation of fuel supply. The shaft 37 drives another fuel pump 49 which by pipe 50 at regulated by hand valve 51 may deliver fuel to the chamber 31 and the latter has ignition means 52 therein. Fuel from pump 49 may be used to supply either a small amount of fuel or a larger amount of fuel to chamber 31 so that in this chamber 31 there may be combustion of extra fuel with the excess air in the exhaust gases from turbine unit M, the turbine unit being proportioned to receive from ambient air a quantity of air which is say three to five times as much as is used for combustion in the combustion chamber or section 33, the extra air providing the necessary air cooling as is usual in gas turbines. But this extra fuel supply to chamber 31 is not necessarily used since the exhaust gases may also be used as hereinafter described. But the additional fuel supply to chamber 31 may be used for extraordinary service. The hand valve 51 when open may permit by-passing of fuel from pump 49 so that such extra fuel will not then be effective. The fuel pumps receive fuel from the fuel supply pipes 53 and 54. The output of the solution pump 16 may be varied proportionately by means of the hand valve 55 or any other control means in substitution therefor. The solution connecting pipe 13 which supplies the spray nozzles has a by-pass pipe 56 controlled by hand valve 57, thus permitting by-passing of some of the solution for separation so that the heat transfer units may, if desired, have more solution passing through them than such as is delivered to spray nozzles, in order that there may be more cooling effect for condensation, proportionately. Ledges 58 and 59 in chambers B and C, respectively, form dividing means to procure movement of gases around the series of heat transfer pipes.

Figure 2:
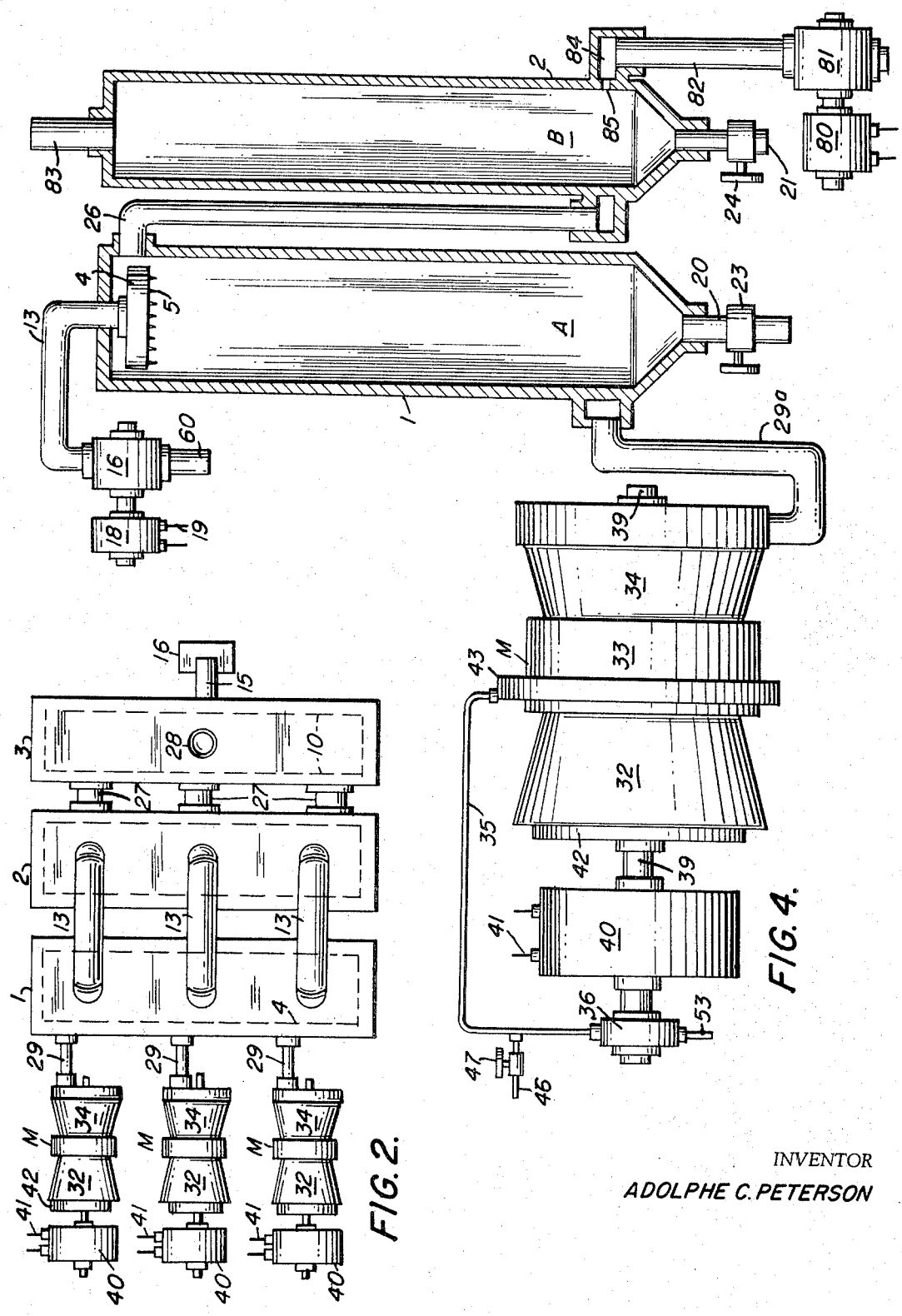

FIGURE 2, diagrammatically shows in plan view the three casings 1, 2, 3 and their connecting pipes, and shows their horizontally extended length in proportion to the transverse width of each of the casings 1, 2, 3, but it shows more than one turbine unit M, to illustrate that there may be any number of the units M to supply the gases to be passed into the lower end of the chamber A. Each unit M has all of the devices which are illustrated in FIGURE 1 in connection with the one M there shown. There may be only one unit M for the set of three casings 1, 2, 3, and their devices, but preferably more are used. The heat transfer units D and E are also relatively long horizontally in relation to their transverse width and have the heat transfer pipes in as many vertical planes as may be suitable and necessary for the particular construction.

The apparatus illustrated in FIGURE 1 (and FIGURE 2) is now further explained in relation to its use and operation, by general description of the operation. It is understood that the solution for separation is supplied to pipe 60 from any source according to the use of the apparatus. For its chief use, the segregation of salt-free water from sea-water, the pipe 60 draws the sea-water from any nearest section of the ocean where there is such sea-water and any necessary amount may be drawn by the pump 16, any excess of water over that issuing from the spray nozzles 5 being discharged by by-pass pipe 56, if such excess is deemed necessary for the proper cooling of the vapor containing gases in chambers B and C, but preferably the entire apparatus is so proportioned that such excess is not necessary for vapor condensation. The devices should be so proportioned that spray nozzles will discharge as much sea-water to chamber A as may be heated to a maximum degree according to the gases passing through chambers B and C. Preferably that temperature is approximately say 200 to 205 degrees Fahrenheit or near that temperature. Flow is from the pipes 20, 21, 22, respectively, to brine storage or other means, salt-free water storage or other means. By regulation with valves 23, 24, 25, respectively (or any automatic means in lieu thereof) the levels of such materials flowing to pipes 20, 21, 22, will be kept at substantially that or near that which will provide coverage with the material for the inlet ends of the pipes 20, 21, 22, respectively, in order that gases will not pass through such pipes.

The turbine 34 of each turbine unit M will be started in operation by any supply of fuel, such as gasoline, oil, natural gases or artificially made gases, as supplied to pump 36 by pipe 53 from any source. Ignition is provided by ignition means 61 in each unit M. In operation the turbine blades receive combustion gases and air as in the well known gas turbine as usually constructed, the air being received by air-port 42, and rotation of the shaft 39 produces the compression of induced air and also drives the generator 40 to serve the main lines 44 with electricity, preferably such as is supplied to city or utility electric main lines. The flow of combustion gases and the excess supply of air (as is normal in turbines) from discharge pipe 30 through chamber 31 to pipe 29 and thereby to chamber A at the latters lower end continues in its passage upwardly through chamber A and as it passes therethrough, the relatively hot gases (at temperatures as provided in a projected plant) having a temperature which may be say at least three hundred degrees and preferably and probably as much as five to six hundred degrees Fahrenheit, or even more, will flow upwardly surrounding and enveloping the sea-water streams or mist droplets and thereby heating the water contained in the sea-water (as previously somewhat heated) so that the water or a large portion thereof is evaporated and carried with the upwardly passing turbine gases and air to the pipe 26 by which the vapor laden gases are carried to chamber B, entering the latter at its top end. The gases from pipe 26 flow in chamber B about the heat transfer pipes 7 transferring heat therefrom to the solution for separation in the heat transfer pipes 7 and thus cooling the solution vapor as carried by the turbine exhaust gases and air so that there is condensation of at least some of the vapor carried. The exhaust gases and air then pass by way of pipe 27 to the lower end of chamber C and move upwardly and surround and envelope the heat transfer tubes 11 so that more heat is transferred from gases and air to the solution in heat transfer pipes 11 so that there is further condensation of any vapor remaining in the gases flowing through chamber C to the flue or smoke-pipe 28 to atmosphere. Thus vapor is condensed in chambers B and C and the condensed vapor flows or descends through the gases and air and along the heat transfer surfaces and thereby collects at the bottom of the chambers in the trench-like spaces provided above the pipes 21 and 22 respectively. It should be noted that in some constructions there may be only the one chamber B and its heat transfer pipes or means 7, this depending in any projected construction on such factors as the relative height or length upwardly of the chamber B. The combustion gases passing through chamber 31 have considerable uncombusted air mixed therewith as is usually necessary in gas turbines for cooling of the turbine rotor, and this excess air may be further heated if that be desired in any construction, by means of fuel from pump 49, ignition occurring by means 52. But such additional combustion of fuel will in some constructions not be needed and preferably dispensed with. The pump 49 may supply only a very small amount of ignition fuel so that the chamber 31 may be used for some supplementary combustion to effect complete combustion or more thorough combustion, in order that there will be less unconsumed matter in the gases passing to chamber A. It is contemplated, however, that in any construction, any such devices as are commonly known, such as filtering devices and chemical purifying devices may be used to cleanse and purify the segregated salt-free water produced and flowing through pipes 21 and 22.

There are many automatic devices used for control of flow of fluids in devices such as boilers and chemical systems, and it is contemplated that any such automatic devices may be used in the realization of my invention for the control of the flow of fluids such as fuel, solution, and air. Like-wise any devices for spray of solution for separation or segregation or any devices for heat transfer may be used.

Figure 3:
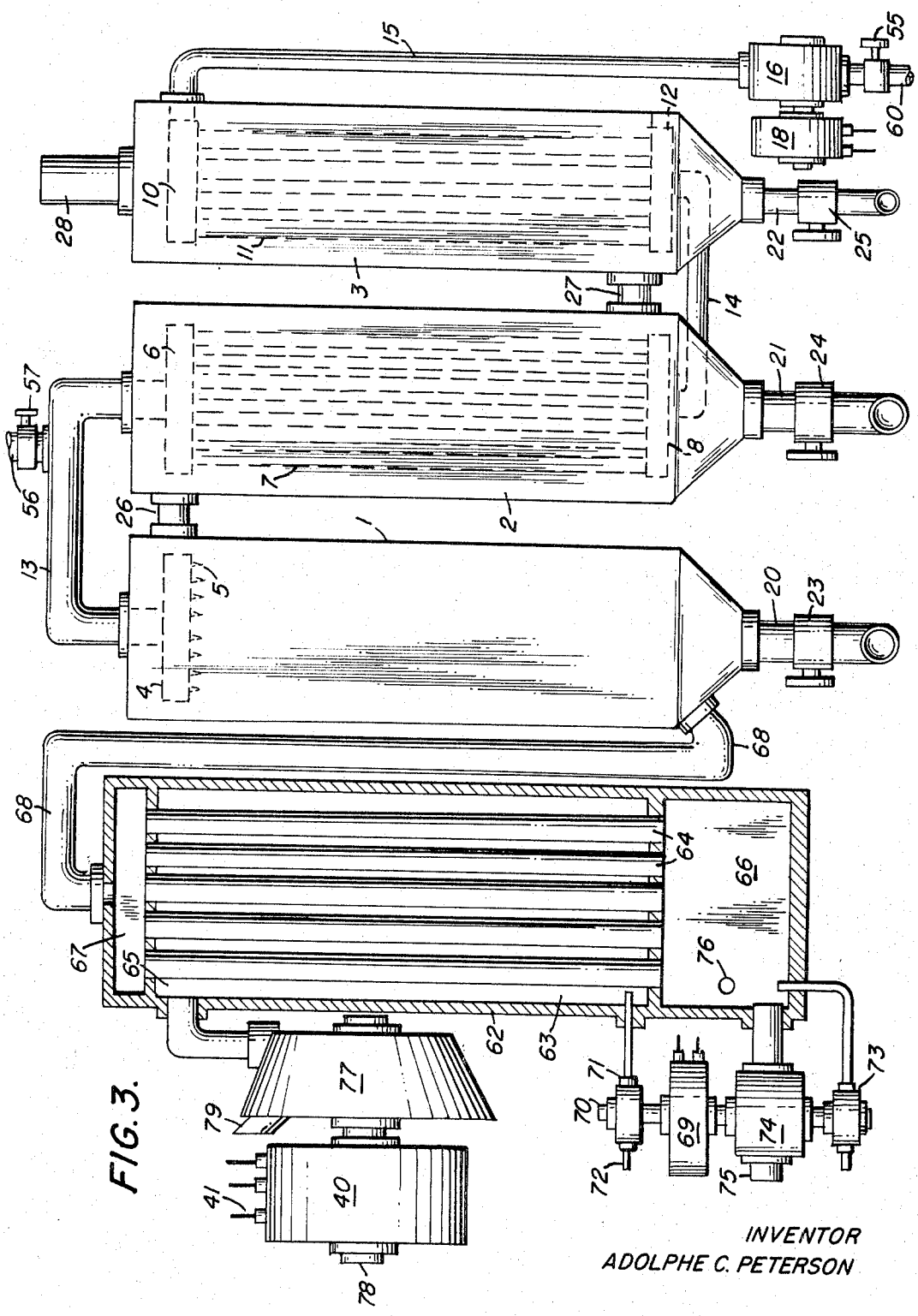
FIGURE 3 is a view in section similar to that of FIGURE 1, but showing a modified form of my device and a modified use of the device, the major units of the invention being similar in character.

Referring now to the modified form which is illustrated in FIGURE 3, this form has the three chambers A, B, C, and each of these is similar to such chambers of the first form and the associated apparatus and connections are also similar to such elements of the first form. The difference in the modified form over the first form is in the means which supplies the heated gases to the chamber A, that is the difference is in the means or method of production of the gaseous fluid which is the carrier fluid for heat and vapor as such fluid passes through the chambers A, B, C. A further difference is in the power device which produces current supply for the electric main lines in the system.

The means producing gaseous fluid in this form consists of a steam producing boiler or steam generator 62 which has water space 63 therein and gas flues 64 vertically positioned and passing upwardly through the water space 63 and upper steam generating space or collecting space 65, the gas flues 64 providing means for passage of hot gases of combustion from a furnace combustion chamber 66 upwardly to the header chamber 67 and thereby to the hot gas pipe designated 68, the latter providing means for flow of the gases as a carrier gaseous fluid through the chambers A, B, C, of the casings 1, 2, 3, and thus by way of the smoke pipe 28 to atmosphere.

An electric motor 69 drives a shaft 70 which in turn drives the pumping elements (not shown) of two pumps, a water pump 71 receiving water by supply pipe 72 and discharging to water space 63, where the water pumped receives heat for steam production, and also a fuel pump 73 and an air blower 74. The fuel pump 73 discharges fuel to furnace chamber 66 and the air blower also discharges air to furnace combustion chamber 66. The air blower 74 receives ambient air by pipe 75. The electric motor 69 has such means for control of its speed as may be found in such motor means generally, it being contemplated that the electric motor and the means it drives should be proportioned in output to the flow of the necessary combustion gases through the steam generator means. Ignition means 76 provides for ignition in chamber 66.

The steam generating space 65 discharges hot steam under high pressure to the steam turbine 77 which by shaft 78 drives the electric generating generator 40 to provide electric current production for the main power lines, utility (power lines), 44. The steam turbine exhausts by pipe 79 to any menas (not shown) for condensation and reuse in the steam production. It is contemplated that any projected plant for the purposes indicated will be of such large productive capacity that electric generation will be provided for a populated community of considerable magnitude, and that the devices as illustrated will be of proportionate large capacity, and production of materials segregated in the chambers A, B, C, will be of proportionate large quantity. It is contemplated that there may be in any plant any suitable number of the pipes 68 discharging gases from the header space 67 and to the chamber A, thus providing for adequate distribution of the hot gases in the lower part of chamber A so that such gases will flow upwardly in chamber A in suitable distribution for effective heat distribution in the descending sea-water spray.

Any means for such adequate distribution of the gaseous fluid in the lower part of chamber A may be provided in substitution. Other devices and combinations may be used in realization of the invention without departing from the spirit and contemplation thereof.

Referring now to the modified form of my invention which is illustrated in FIGURE 4, this form may have either the power production means which is shown in FIG. 1 or that form of power production apparatus which is shown in FIGURE 3, the FIGURE 4 being shown however with that form of power production means as illustrated in FIGURE 1. The power production means is used in connection with an evaporation chamber A is casing 1, and a condensation chamber B in casing 2. The combustion gases and any excess air carried therewith flows from the turbine unit M by pipe 29a to the chamber A at the lower end thereof and rises therein to be intermingled with the fine spray of solution for segregation (as in first form shown) and carries evaporated liquid from the solution through pipe 26 to the condensation chamber B but in this case the pipe 29a carries the gaseous fluid to the lower end of chamber B.

An electric motor 80 drives air blower 81 inducting cooling air from ambient air of the atmosphere, and this cooling air is discharged from the blower to the lower end of the condensation chamber B by the pipe 82. The cooling air so introduced to chamber B intermingles with the combustion gases and intermingled evaporated liquid rising in chamber B and so rising the cooling air absorbs heat from the evaporated liquid vapor thus condensing at least a considerable portion thereof so that such condensation falls downwardly in chamber B to outlet pipe 21 by which condensed water is withdrawn. The combustion gases and cooling air relieved of much of the evaporated liquid from chamber A then rises to the smoke stack or chimney outlet 83 and thus to atmosphere. The cooling air is delivered from pipe 82 to a channel 84 extended along lower part of chamber B and discharged to chamber B by many small openings 85 one being shown, thus procuring thorough dissemination in chamber B.

What I claim is:

1. An apparatus comprising a low pressure evaporation chamber, a condensation chamber having a condensation space and cooling conduit means in heat transfer relation with a vapor bearing fluid through said conduit means to absorb heat from said vapor bearing fluid in said condensation chamber space, means for flow of a cooling fluid through said cooling conduit means to absorb heat from said vapor bearing fluid in said condensation chamber space; a power producing plant utilizing fuel and air combustion to effect power generation, means for flow of gases of combustion from said power producing plant to said low pressure evaporation chamber for movement therethrough in heat transfer relation by intimate and direct contact with the solution for segregation; means for flow of said combustion gases from said low pressure evaporation chamber with vaporized solvent from said solution to said condensation chamber space; means for flow of said combustion gases after substantial removal of condensed solvent therefrom in said condensation chamber space from said condensation chamber space and discharge to ambient air; the said power producing plant comprising a steam generating and heating unit, a combustion chamber and means for supplying air and fuel thereto for combustion therein and gas passage means for flow in indirect heat transfer relation with said steam generating and heating unit, a steam energized engine means with conduit and inlet means in communication with said steam generating and heating unit for receiving steam from said unit, the said gas passage means having means connected to said low pressure evaporation chamber for flow of combustion gases thereto; there being progressive flow of combustion gases to generate and heat steam, to evaporate liquid from the solution for segregation and to carry the vapor evolved to said condensation chamber space; said evaporation chamber having means to remove the unevaporated portion of said solution and said condensation chamber space having means to remove condensate.

2. An apparatus for segregation of materials in solution of the character described comprising an air induction means providing flow of atmospheric air to a combustion chamber means, steam generating means positioned in indirect heat transfer relation with said combustion chamber and the gases flowing in said combustion chamber means; means to deliver steam as generated from said generating means to a kinetic energy producing means utilizing such steam; means for supplying liquid for steam generation to said steam generating means and means for delivering fuel to said combustion chamber means for combustion therein with the air flowing thereto; an evaporation chamber and means connecting said evaporation chamber to the combustion chamber means and through which exhaust combustion gases flow from said combustion chamber means for diffusion in said evaporation chamber; means for flow of solution for segregation to said evaporation chamber for dissemination with the exhaust combustion gases flowing thereto; said evaporation chamber constructed in such a manner that the exhaust gases and the solution flow in intimate and direct contact with each other in said chamber; means for flow of the exhaust gases bearing vapors evolved from said solution from the evaporation chamber and into a condensation chamber; means for flow of a cooling fluid through heat transfer means in said condensation chamber in indirect heat transfer relation with the gaseous and vapor fluid flowing to said condensation chamber from said evaporation chamber; means for discharging from said condensation chamber exhaust gases, relieved of at least a portion of the vapors carried thereby, to ambient air and means for removing condensate from said condensation chamber.

3. A power plant and solvent recovery means comprising a steam generating and heating unit comprising fluid container means, means for supplying liquid for steam generation to said fluid container means and gas passage means in said unit for indirect heat transfer between the gases and the liquid in the fluid container means; combustion chamber means having means to supply air and fuel thereto and to provide combustion therein; means to pass combustion gases from said combustion chamber to said gas passage means; an evaporation chamber, means for delivering solution for segregation to said evaporation chamber, means for withdrawing unevaporated solution from said evaporation chamber; a condensation chamber space, heat absorption conduit means in heat transfer relation with gases and vapor in the condensation chamber space; a gas discharge means from the condensation chamber space; connecting means between the gas passage means and the evaporation chamber for flow of combustion gases from the gas passage means to the evaporation chamber; connecting means between the evaporation chamber and the condensation chamber space for flow of combustion gases and vapor borne thereby to the condensation chamber space; the gases and added vapor flowing progressively from the gas passage means to the evaporation chamber to the condensation chamber space to the gas discharge means; means to pass solution for segregation through the inlet of said heat absorption conduit means; and means to pass solution for segregation from said heat absorption means to said means for delivering solution to said evaporation chamber.

4. An apparatus comprising a combustion furnace means, a steam generating and heating unit, said unit comprising a steam generating and heating chamber and gas passage means, for the flow of combustion gases from the combustion furnace unit, said chamber and said gas passage means in mutual heat transfer relation with each other; means for supplying liquid for steam generation to the steam generating and heating chamber, an evaporation chamber, a condensation chamber; connecting means between the steam generating and heating chamber and the evaporation chamber and between the evaporation chamber and the condensation chamber to permit the flow of gases from said combustion furnace means through said gas passage means to said evaporation chamber and from said evaporation chamber to said condensation chamber and therefrom to discharge; means for delivering air and fuel to said combustion furnace means for combustion; means for supplying a solution for segregation to said evaporation chamber and for dissemination therein in intimate and direct contact with the gases flowing therein from said gas passage means; heat absorption conduit means in indirect heat transfer relation with gases and vapor passing in said condensation chamber and means for passing cooling fluid through said heat absorption conduit means; means for removal of liquid condenate from said condenser chamber; steam driven engine means for receiving generated and heated steam from said steam generating and heating chamber and conduit means connecting said steam generating and heating chamber in steam flow relation to said engine means.

References Cited

UNITED STATES PATENTS

| | | | |
|---|---|---|---|
| 645,790 | 3/1900 | Conover | 202—152 |
| 1,544,029 | 6/1925 | Nelson | 203—10 |
| 2,018,049 | 10/1935 | Allen | 203—14 |
| 2,372,846 | 4/1945 | Nettel et al. | 203—11 |
| 2,375,713 | 5/1945 | Weidner | 202—189 |
| 2,637,684 | 5/1953 | Buffum | 203—10 |
| 2,759,882 | 8/1956 | Worthen et al. | 203—24 |
| 2,781,635 | 2/1957 | Brogdon | 60—39.05 |
| 2,856,074 | 10/1958 | Dubitzky | 202—234 |
| 2,921,004 | 1/1960 | Wood | 203—10 |
| 3,080,302 | 3/1963 | Rogers | 202—185 |
| 3,095,699 | 7/1963 | Bauer | 60—39.18 |
| 3,192,130 | 6/1965 | Pottharst | 202—186 |

WILBUR L. BASCOMB, Jr., *Primary Examiner.*

N. YUDKOFF, *Examiner.*

M. H. SILVERSTEIN, *Assistant Examiner.*